UNITED STATES PATENT OFFICE.

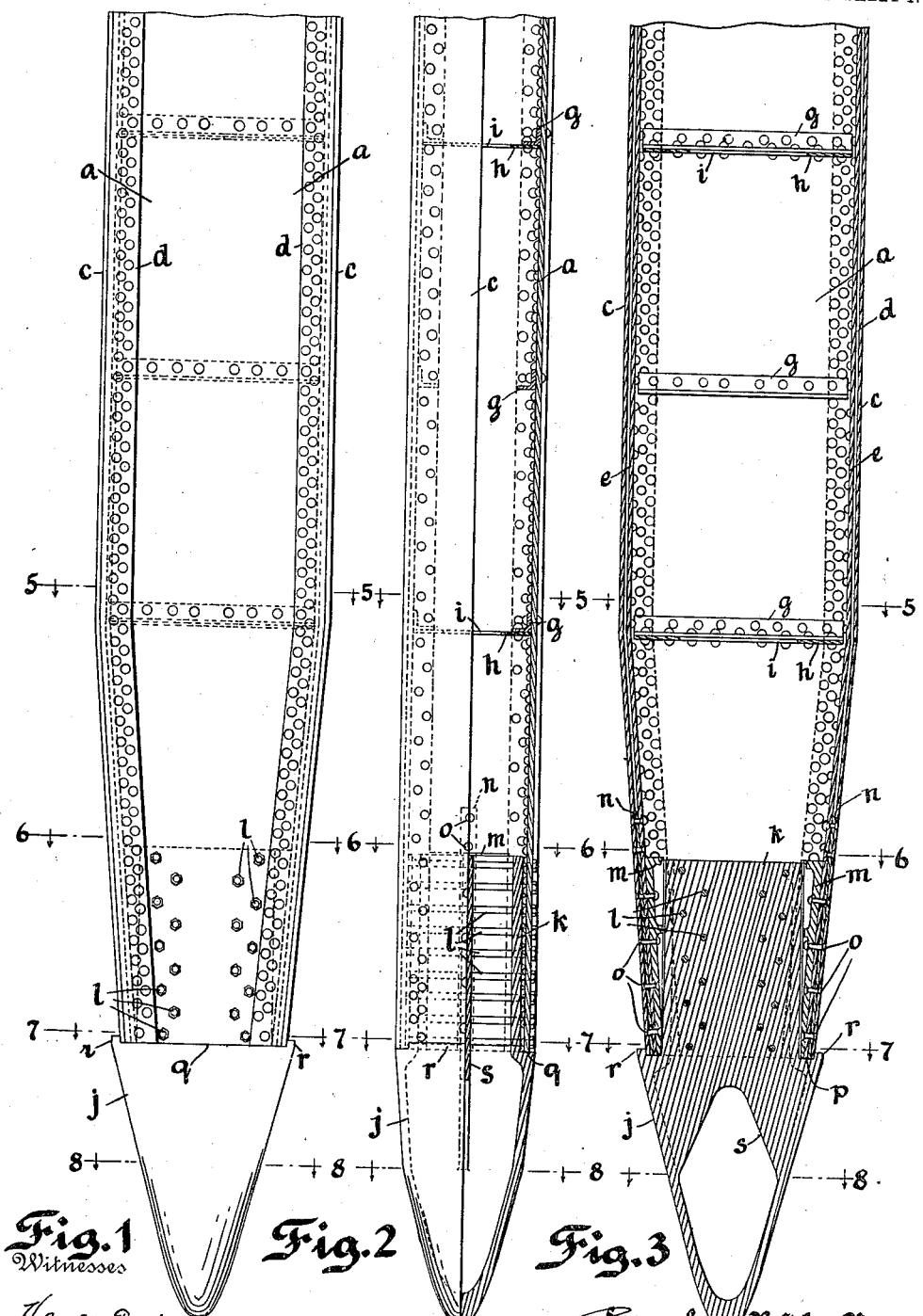

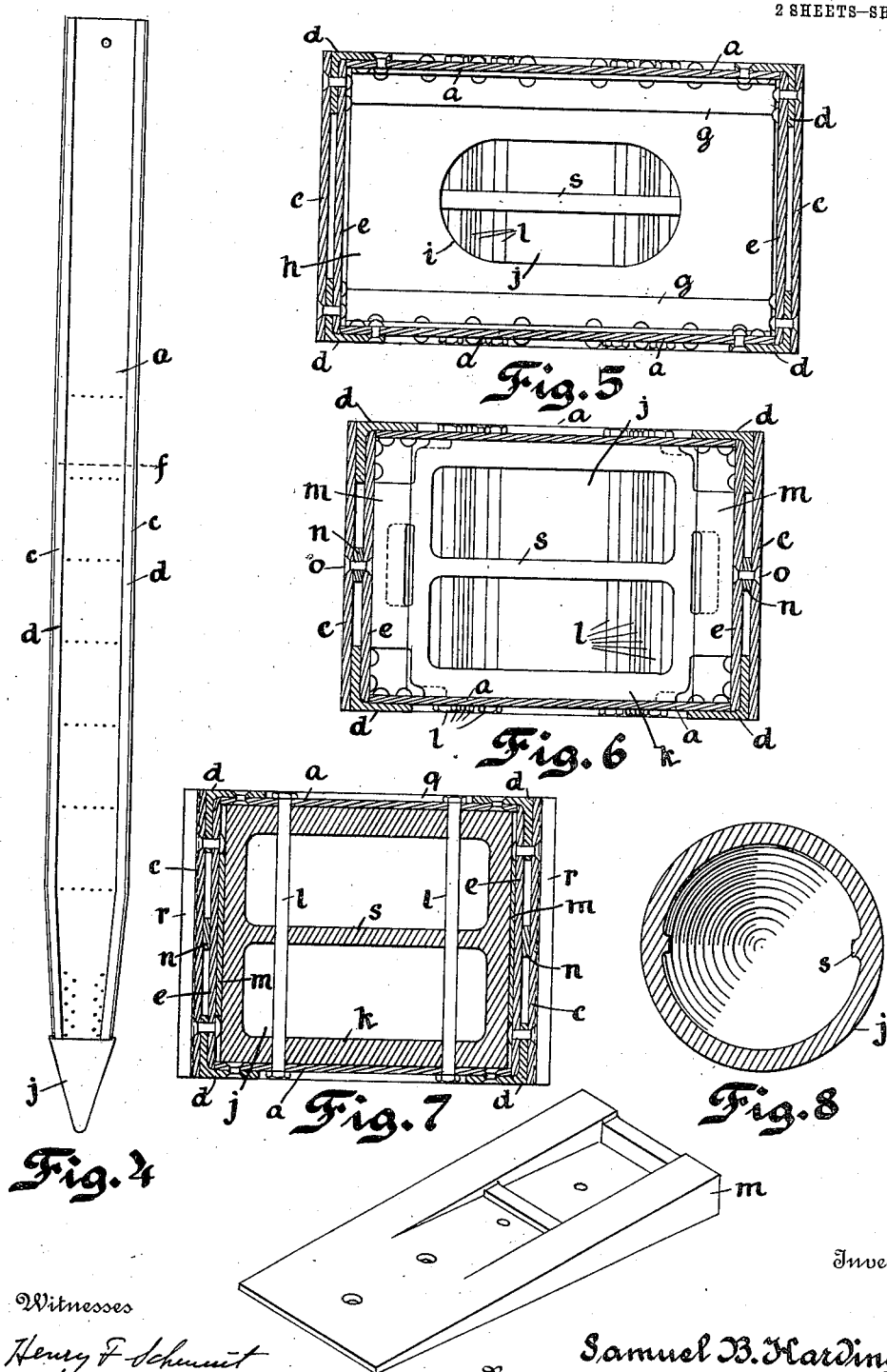

SAMUEL B. HARDING, OF WAUKESHA, WISCONSIN, ASSIGNOR TO MODERN STEEL STRUCTURAL COMPANY, A CORPORATION OF WISCONSIN.

SPUD FOR GOLD-DREDGES.

1,006,845.  Specification of Letters Patent.  Patented Oct. 24, 1911.

Application filed February 8, 1911. Serial No. 607,365.

*To all whom it may concern:*

Be it known that I, SAMUEL B. HARDING, of Waukesha, Wisconsin, have invented a Spud for Gold-Dredges, of which the following is a specification.

This invention relates to gold-dredges and specifically to that feature thereof known as a spud which is used for anchoring the dredge so that it can swing about a given point as a center. Devices of this class are in the form of a metal box-beam built up of structural-plates and angles and pointed at one end, said pointed end being formed by means of a special casting which is secured to the end of the box-beam.

One object of my invention is to provide an improved construction for dredge-spuds, in order to avoid certain weak points in their construction as heretofore made. These spuds are liable to heavy bending or shearing stresses near their lower ends, due to the working action of the dredge, which causes the shearing and loosening of the rivets holding the members of the box-beam together, as the whole reacts (due to the working action of dredging) against its guide or support.

My invention comprises a means for reinforcing the outer faces of the beam-portion of the spud, and for taking excessive shearing stress off the rivets at the point where the beam comes in contact with its guides. This I accomplish by disposing the side-plates so as to bear directly on corner-angles or reinforcing-plates so as to effect a distribution of said stress.

Another object of my invention is to provide an improved means for interlocking the spud-point with the beam or shank-portion which shall also remove most of the lateral or shearing strain from the rivets. In former constructions it has been customary to provide the spud-point with a butt or tang which is inserted into the box-beam and is secured in place therein; but experience shows that such construction is likely to result in the shearing off of rivets or bolts and the ripping out of that one of the faces of the beam against which the strain is brought. In my invention this side shear upon the rivets and the possibility of tearing out the end of the beam are completely removed. Furthermore, I aim to provide improved means whereby said butt or tang may be solidly secured in the tapering end of the shank or beam-portion, which according to previous constructions has not been possible.

Other objects and features of my invention will appear from the following detailed description thereof, reference being had to the accompanying drawings wherein—

Figure 1 is a side-elevation of the lower end of a spud constructed according to my invention; Fig. 2 is a rear view thereof, that is to say on a plane at right angles to that of Fig. 1, the right-hand half being shown in longitudinal central section; Fig. 3 is a longitudinal central section in a plane parallel to that of Fig. 1; Fig. 4 is a side-elevation of the complete spud on a smaller scale; Figs. 5, 6, 7 and 8 are cross-sections of the spud respectively on the planes 5, 6, 7 and 8; and Fig. 9 is a perspective view of one of the wedges or keys used for securing the spud-point in place.

The reference letters refer each to the same part in each figure of the drawings.

The shank or rectangular beam-portion of the spud is built up of two side- or web-plates $a$; cover-plates $c$ on the narrower edge-faces; angle-bars $d$ at the four corners, whose respective flanges are riveted on the outer sides of the plates $a$, and on the inner sides of the plates $c$; and reinforcing cover-plates $e$ lying parallel to the plates $c$ and on the inner sides of the flanges of the angles $d$ as shown, said reinforcing-plates constituting an important element of my invention. All the rivets securing these pieces together are countersunk on the outside so as to present smooth flush-surfaces enabling the spud to slide easily through the guide aperture provided therefor in the dredge. It will be noted moreover that, as shown in Fig. 5, the edges of the reinforcing-plates $e$ are made to fit snugly in the inner angles of the angle-bars $d$, and that the edges of the side-plates in turn abut closely upon the faces of the reinforcing-plates $e$. Now when any bending-stress is brought upon the spud, a stress is brought upon the reinforcing-plates, angles and cover-plates to draw them toward the neutral axis. Were the reëntrants of the angle-bars $d$ empty, this strain would fall entirely upon the few rivets near the point of contact between the spud and its guide as a shearing stress, and destroying the few rivets near by; but by the above described arrangement, the edgewise stress which would otherwise come on the rivets in shear is supported directly upon the edge of the web- or side-plates through pressure on the reinforcing-plate, the angle-bar and the cover-plate. The reinforcing-plates *e* will not ordinarily extend all the way to the top of the spud, but need extend only part way, as for instance to the point *f*, Fig. 4, as the upper portion of the spud is not subjected to as great a flexural stress as the lower portion.

For stiffening and torsional purposes the spud is provided at intervals with transverse angle-bars *g* and stiffening-plates *h* riveted thereto, called diaphragms, such plates having holes *i* therein to give access to the parts below.

The lower portion of the spud is made tapering toward the point on the edge-faces as shown, and to the lower end of this tapering portion is secured the spud-point *j*. The spud-point *j* has a butt-portion on tang *k* which enters the tapering end of the shank or beam-portion; and to secure this properly in place has been a difficult problem as the point must necessarily be inserted from the lower end. According to my invention the sides of the tang *k* are made parallel and are secured in place by transverse bolts *l* and by a pair of taper-keys or wedges *m* which are planed to fit and are placed on the tapering sides of the shank as shown, and riveted to the corner and reinforcing-plates by rivets *o*, these serving to hold the point solidly distributing the bending pressure evenly over the reinforcing-plates and thence to the rivets on the corner-angles. This prevents the point from becoming loose with respect to the shank or rectangular built-up spud-beam.

Between the plates *c* and *e* at the lower portions of the shank and opposite the keys *m* are inserted filling-plates *n* which are secured to said plates by the rivets *o*, said filling-plates serving to transmit a portion of the stress from the plates *e* to the plates *c*.

At the base of the tang *k* are formed abutment-shoulders *p* and *q* against which abut the ends of the plates and angles of the shank, which are milled or planed off to form a suitable abutment-surface, and outside of these shoulders on the edge-faces are formed projecting lugs *r* which engage with the outer faces of the cover-plates *c*. These lugs form an important feature of my invention and they serve to prevent the tearing out of the rivets on the ends of the shank as hereinabove referred to; for it will be noted that any side-strain brought upon the point will now be divided equally between the edge-plates on one side and those on the other, in each case being transferred to them directly by the pressure of the tang and by one of the lugs *r*, so that there will be no tendency to tear out the plates of the shank.

The spud-point *j* is preferably cast hollow as shown for the saving of unnecessary weight and provided with a medial stiffening web *s* as shown.

While I have hereinabove described the preferred form of my invention, I wish it understood that I do not limit myself to any one of the particular features thereof, and I fully realize that it is capable of numerous modifications, and I consider such modifications and omissions may be made without departing from the principle of my invention.

Having thus described my invention what I claim as new and desire to secure by Letters Patent is:

1. In a dredge-spud, the combination with the web-plates perpendicular to the neutral axis of flexure, angle-bars which the edges of said web-plates overlap on the inside of the angle and to which they are secured by fastening devices, and plates parallel to said neutral axis and also secured to said angle-bars; the edges of said web-plates abutting upon solid metal on the inside of the angle whereby to remove shearing stress from said fastening devices.

2. In a dredge-spud, the combination of the angle-bars at the four corners, the web-plates perpendicular to the neutral axis and having their side-edges secured to the corresponding flanges of said angle-bars, a pair of cover-plates parallel to the neutral axis and overlapping the corresponding flanges of said angles on the outside, a pair of reinforcing-plates parallel to said cover-plates and lying against the inside of the flanges of said angles, and fastening devices passing through the overlapping portions of said cover-plates, angle-bars and reinforcing-plates and securing them together.

3. In a dredge-spud, the combination of the angle-bars at the four corners, the web-plates perpendicular to the neutral axis and having their side-edges secured to the corresponding flanges of said angle-bars, a pair of cover-plates parallel to the neutral axis and overlapping the corresponding flanges of said angles on the outside, a pair of reinforcing-plates parallel to said cover-plates and lying against the inside of the flanges of said angles, and fastening devices passing through the overlapping portions of said cover-plates, angle-bars and reinforcing-plates and securing them together; the side-edges of said web-plates abutting upon solid metal whereby to support said angle-bars directly upon the edges of said web-plates.

4. In a dredge-spud, the combination of the angle-bars at the four corners, the web-plates perpendicular to the neutral axis and having their side-edges secured to the corresponding flanges of said angle-bars, a pair of cover-plates parallel to the neutral axis and overlapping the corresponding flanges of said angles on the outside, a pair of reinforcing-plates parallel to said cover-plates and lying against the inside of the flanges of said angles, and fastening devices passing through the overlapping portions of said cover-plates, angle-bars and reinforcing-plates and securing them together; said reinforcing-plates extending into and filling the reëntrant corners of said angle-bars, and the edges of said web-plates abutting upon the ends of said reinforcing-plates 5. In a rectangular box-beam, the combination of the web-plates perpendicular to the neutral axis, angle-bars at the corners, fastenings securing said web-plates to the corresponding flange of said angle-bars, the edges of the former abutting directly upon solid metal supported by said angle-bars, and a cover-plate parallel to the neutral axis and secured to the other flange of said angle-bars.

6. In a rectangular box-beam, the combination of the web-plates perpendicular to the neutral axis, angle-bars at the corners, fastenings securing said web-plates to the corresponding flange of said angle-bars, the edges of the former abutting directly upon solid metal supported by said angle-bars, and a pair of plates parallel to the neutral axis and secured to the corresponding flanges of said angle-bars on opposite sides thereof.

7. In a box-beam, the combination of the angle-bars at the corners of the beam and plates parallel to the neutral axis and secured on the inner face of the corresponding flanges of said bars, their ends extending into and filling the reëntrant corners of said angle-bars, and web-plates perpendicular to the neutral axis secured to the inner faces of the other flanges of said angle-bars and having their edges abutting upon the ends of said first-named plates.

8. In a box-beam, in combination with the angle-bars at the corners of the beam, a plate parallel to the neutral axis and secured on the inner face of the corresponding flanges of said bars, its ends extending into and filling the reëntrant corners of said angle-bars, web-plates perpendicular to the neutral axis secured to the inner faces of the other flanges of said angle-bars, having their edges abutting upon the ends of said first-named plate, and a second plate parallel to the neutral axis and lying outside the corresponding flanges of said angle-bars.

9. In a dredge-spud, in combination with a rectangular metal shank, a spud-point having a tang extending into the end of said shank and secured thereto, abutment-shoulders at the base of said shank, and a lug overlapping and engaging the outer side of the edge of said shank.

10. In a dredge-spud, in combination with a rectangular metal shank, a spud-point having a tang extending into the end of said shank and secured thereto, abutment-shoulders at the base of said shank, and a pair of lugs on said spud-point on the sides parallel to the neutral axis overlapping and engaging the outer side of the edges of said shank.

11. In a dredge-spud, the combination with the hollow box-beam having a tapering lower end, of a spud-point having a rectangular tang which is received within and secured to said lower end, and a wedge-shaped key lying between the inner face of said beam and said tang and filling the space between them whereby to give a solid support to said tang.

12. In a dredge-spud, the combination with the hollow rectangular box-beam having a tapering lower end, of the spud-point having a rectangular tang received within said lower end, and a pair of wedge-shaped keys on the opposite sides of said tang and filling the space between it and the inner faces of said box beam.

13. In a dredge-spud, the combination with the hollow box-beam having a tapering lower end, of a spud-point having a rectangular tang which is received within and secured to said lower end, and a wedge-shaped key lying between the inner face of said box-beam and said tang and filling the space between them whereby to give a solid support to said tang, said spud-point having further a lug at the base of said tang and overlapping and engaging the outer side of the lower end of said shank.

14. In a dredge-spud, the combination with the hollow rectagular box-beam having a tapering lower end, of the spud-point having a rectangular tang received within said lower end, and a pair of wedge-shaped keys on the opposite sides of said tang and filling the space between it and the inner faces of said box-beam; said spud-point having further abutment shoulders at the base of said tang and a pair of lugs parallel to the neutral axis overlapping and engaging the outer side of the lower edges of said box-beam.

15. The combination of a hollow box-beam comprising angle-bars at the four corners, cover-plates parallel to the neutral axis and overlying the outer faces of the corresponding flanges of said angle-bars, reinforcing cover-plates parallel to the neutral axis and overlapping the inner faces of said flanges and extending into and filling the reëntrant corners of said angle-bars, each cover-plate, reinforcing-plate and pair of angle-bars being secured together by rivets, and the web-plates perpendicular to the neutral axis and overlying the inner faces of the other flanges of said angle-bars and secured thereto, their edges abutting upon the ends of said reinforcing-plates; the sides of said box-beam parallel to the neutral axis converging at the lower end thereof; a spud-point having a rectangular tang received within said lower end, and one or more wedge-shaped keys filling the space between the sides of said tang and said reinforcing-plates; said spud-point having further lugs overlying and abutting upon the outer faces of the lower ends of said cover-plates.

In witness whereof I have hereunto set my hand in presence of two witnesses.

SAMUEL B. HARDING.

Witnesses:
 GEORGE W. COLLES,
 F. M. MALLON.

Copies of this patent may be obtained for five cents each, by addressing the "Commissioner of Patents, Washington, D. C."